United States Patent [19]

Ogino

[11] Patent Number: 4,802,713
[45] Date of Patent: Feb. 7, 1989

[54] SYSTEM FOR CONTROLLING MOTOR VEHICLE BRAKES

[75] Inventor: Kinji Ogino, Saitama, Japan

[73] Assignees: Akebono Brake Industry Co., Ltd., Tokyo; Akebono Research and Development Centre Ltd., Saitama, both of Japan

[21] Appl. No.: 94,554

[22] Filed: Sep. 9, 1987

[30] Foreign Application Priority Data

Sep. 10, 1986 [JP] Japan ................ 61-211440

[51] Int. Cl.$^4$ .................... B60T 8/42; B60T 13/68
[52] U.S. Cl. ................................ 303/119; 303/100; 303/114; 303/115; 303/DIG. 3
[58] Field of Search ............ 303/91, 92, 111, 113–119, 303/100, 68, 69, DIG. 1,2,3,4; 188/181

[56] References Cited

U.S. PATENT DOCUMENTS

| | | | |
|---|---|---|---|
| 4,589,706 | 5/1986 | Leiber | 303/114 |
| 4,720,152 | 1/1988 | Adachi et al. | 303/113 |
| 4,721,345 | 1/1988 | Nishimura et al. | 303/115 X |
| 4,728,155 | 3/1988 | Resch | 303/119 X |
| 4,741,581 | 5/1988 | Krohn | 303/119 X |

Primary Examiner—Douglas C. Butler
Attorney, Agent, or Firm—Cushman, Darby & Cushman

[57] ABSTRACT

A system for controlling a motor vehicle brake comprising a supply-and-exhaust valve group which supplies hydraulic pressure for a brake to wheel cylinders of brakes and exhausts hydraulic pressure in the wheel cylinders. A switch valve group which controls a supply to the decompression valve so that hydraulic pressure is supplied to the supply-and-exhaust valve group whether passing through the decompression valve or not. Slip dectecting device detects a slipping status of the driving wheels. Slipping threshold value setting device which determines a slipping threshold. Deceleration status detecting device detects a deceleration status of wheels when the vehicle decelerates. Deceleration status threshold value setting device determines a deceleration status threshold value. A control unit controls, in a slip-prevention control of the system, the switch valve group to supply hydraulic pressure to the supply-and-exhaust valve group through the the decompression valve, and controls the supply-and-exhaust valve group according to the predetermined slipping threshold value to prevent the driving wheels from slipping. In a skid-prevention control, the control unit controls the switch valve group to supply hydraulic pressure not decompressed by the decompression valve to the supply-and-exhaust valve groups, and controls the supply-and-exhaust valve group according to the deceleration status threshold value in order to prevent the driving and driven wheels from skidding.

5 Claims, 4 Drawing Sheets

SYSTEM FOR CONTROLLING MOTOR VEHICLE BRAKES

BACKGROUND OF THE INVENTION

1. Field of the Invention

The present invention relates to a system for controlling a motor vehicle brake. More particularly, the invention relates to a system, with a simple device, for effectively preventing driving wheels from slipping when the vehicle accelerates, and for effectively preventing the driving and driven wheels from skidding when the vehicle decelerates.

2. Background of the Prior Art

Conventional system for preventing wheels of a vehicle from slipping have been known, for example, a system which controls an output of power of a vehicle engine and a system which actuates a brake force to an primary brake system with a hydraulic pressure source. These conventional systems, however, require extra equipment which raises the cost.

Further, there has been a conventional system for preventing vehicle wheels from skidding by electrically controlling valves for a brake. Such a system also requires additional independent equipment which would cause the system to increase in cost.

Furthermore, the conventional system for preventing the driving wheels from slipping does not provide a high pressure source for preventing the wheels from skidding in contrast to the system for preventing the wheels from skidding.

Therefore, the vehicle having such a system has a problem that the vehicle may skid when a large braking force is applied to the wheels.

SUMMARY OF THE INVENTION

The present invention is intended to solve the above problems of the conventional systems. It is therefore an object to provide a system with a simple device for effectively preventing driving wheels from slipping when a vehicle accelerates and for preventing driving and driven wheels from skidding when the vehicle decelerates.

In order to achieve the foregoing objects and advantages, the system of the present invention comprises a supply-and-exhaust valve group which supplies to and exhausts from wheel cylinders braking hydraulic pressure. A switch valve group is controlled to supply the hydraulic pressure to a decompression valve so that hydraulic pressure is supplied to the supply-and-exhaust valve group either through or not through the decompression valve. A slip detection means detects a slipping status of the driving wheels. A slipping threshold value setting means determines slipping threshold value. A deceleration status detection means detects a deceleration status of the driving and driven wheels when the vehicle decelerates. A deceleration status threshold value setting means determines a deceleration status threshold value. A control unit exercises overall control. The control unit controls, during slip-prevention control of the system, the switch valve group to supply hydraulic pressure to the supply-and-exhaust valve group through the decompression valve. It also controls the supply-and exhaust valve group according to the predetermined slipping threshold value to prevent the driving wheels from slipping. In a skid-prevention control, the control unit controls the switch valve group to supply hydraulic pressure not decompressed by the decompression valve to the supply-and-exhaust valve group and it controls the supply-and-exhaust valve group according to the deceleration status threshold value in order to prevent the driving and driven wheels from skidding.

The system for controlling motor vehicle brake is advantageous in that slipping of the driving wheels and skiding of the driving and driven wheels are effectively prevented.

That is, in the slip-prevention control of the system when the motor vehicle accelerates, hydraulic pressure for a brake decompressed by the decompression valve to an appropriate pressure is supplied to the supply-and-exhaust valve group. Then, the control unit controls the supply-and-exhaust valve group according to the predetermined slipping threshold value to achieve the maximum rotational speed of the driving wheels without slipping. Therefore, the driving wheels rotate with an appropriate driving force without slipping.

In the skid-prevention control of the system, high hydraulic pressure for a brake is supplied directly to the supply-and-exhaust valve group without passing through the decompression valve. The control unit controls the supply-and-exhaust valve group according to the predetermined deceleration status threshold value so that hydraulic pressure which is sufficiently high but not excessive is supplied to the driving and driven wheels. Therefore, the vehicle effectively decelerates without the skidding of the wheels.

DETAILED DESCRIPTION OF THE INVENTION

Preferred embodiments of the present invention will be described in detail with reference to accompanying drawings.

Figure 1:
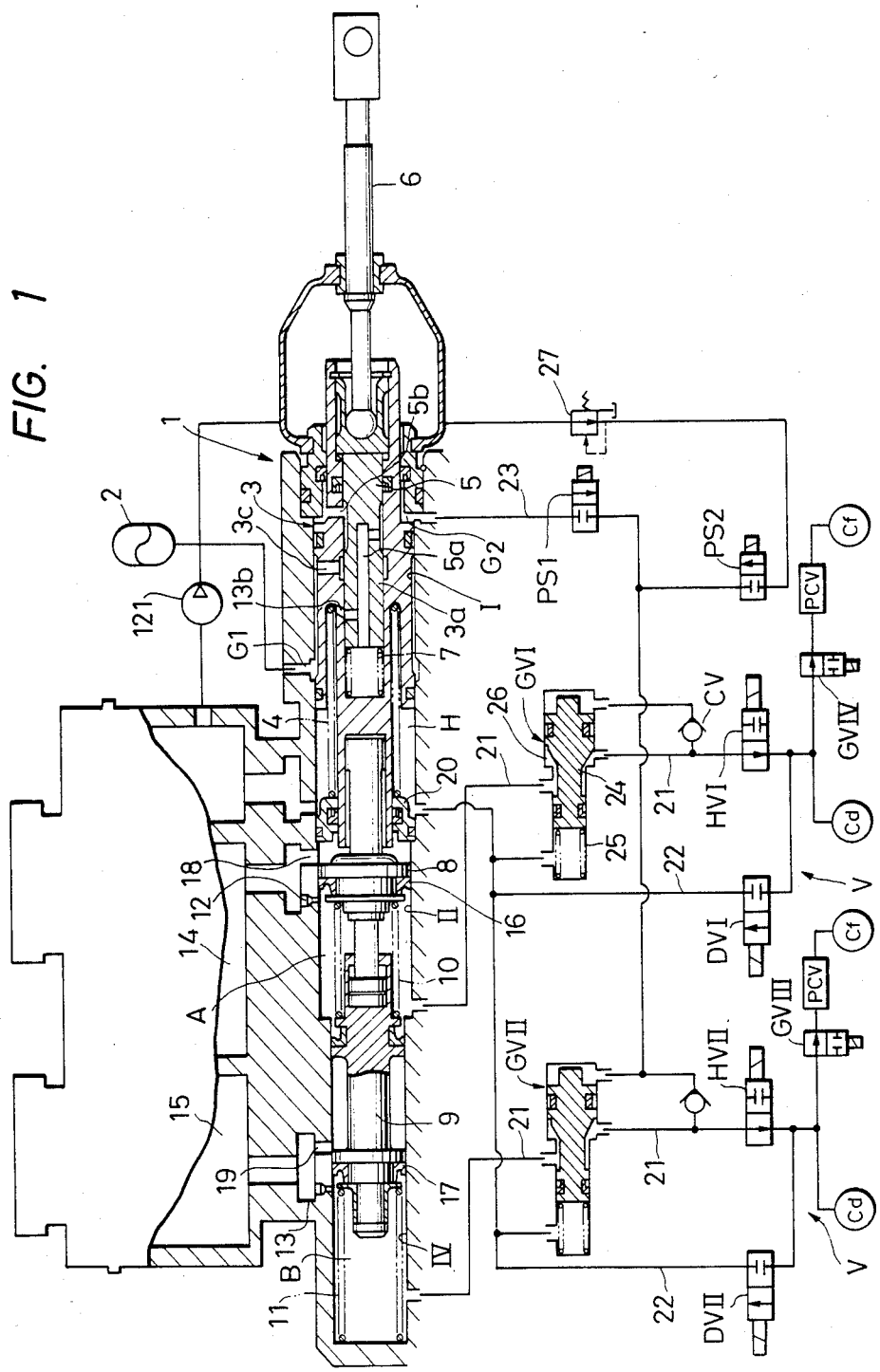
FIG. 1 is a longitudinal sectional plan view showing a system of a first embodiment of the present invention.

FIG. 1 is a longitudinal sectional plan view showing system of a first embodiment of the present invention. The system prevents vehicle wheels from skidding according to hydraulic pressure proportioned to a force applied to a brake pedal (not shown in FIG. 1).

A master cylinder 1 comprises first, second and third cylinders I, II and III. The first cylidner I has therein a first hydraulic pressure generating mechanism generating a hydraulic pressure from an accumulator 2 as hydraulic pressure for a brake. The generated hydraulic pressure is proportional to a force applied to a brake pedal (not shown in FIG. 1). The second cylinder II has therein a second hydraulic pressure generating mechanism generating a hydraulic pressure for a brake of a first brake system. A third cylinder III has therein a third hydraulic pressure generating mechanism generating a hydraulic pressure for a brake of a second brake system.

A control piston 3 is slidably fitted inside of the first cylinder I and is always urged rearwardly (rightwardly of FIG. 1) to an opening of the first cylinder I by a compression spring 4. A switch piston 5 is slidably fitted inside of an axial cylinder 3a provided in the control piston 3. A rear end of the switch piston 5 is connected to a push rod 6 associated with the brake pedal.

FIG. 1 shows a system in a condition that no force is applied to the brake pedal. In this condition, a fluid chamber $G_2$ communicates with a hydraulic pressure releasing chamber H through passages 3b and 5a.

When force is actuated to the brake pedal to thereby push the push rod 6 forwardly, the switch piston 5 is pushed into the control piston 3 so that the communication between the passages 3b and 5a is cut off and then the fluid chamber $G_2$ communicates with a fluid chamber $G_1$ to thereby introduce hydraulic pressure from the accumulator 2 into the fluid chamber $G_2$. The hydraulic pressure introduced into the fluid chamber $G_2$ also actuates, through the switch piston 5, the push rod 6 to move rearwardly to thereby produce a reaction to the brake pedal. Therefore, the hydraulic pressure introduced into the fluid chamber $G_2$ is maintained to a value proportional to the force applied to the brake pedal.

The switch piston 5 is always urged rearwardly by a compression spring 7. The second and third hydraulic pressure generating mechanisms provided in the second and third cylinders II and III form a so called tandem master cylinder. The tandem master cylinder comprises a first hydraulic pressure piston 8 connected to a front end of the control piston 3, a second hydraulic pressure piston 9 provided against a front end of the first hydraulic pressure piston 8 through a compression spring 10, and a compression spring 11 always urging the second hydraulic pressure piston 9 rearwardly. With these elements, the tandem master cylinder is provided with a first and second hydraulic pressure chambers A and B. The second hydraulic pressure chamber B is positioned at a rear and front sides, respectively, of the second hydraulic pressure piston 9.

When a force is not applied to the brake pedal, as shown in FIG. 1, the first and second hydraulic pressure chambers A and B communicate with reservoirs 14 and 15 through compensating ports 12 and 13, respectively. In this condition, when force is applied to the brake pedal, both piston cups 16 and 17 of the hydraulic pressure pistons 8 and 9 close the compensating ports 12 and 13, respectively, to thereby produce hydraulic pressures which correspond to amount of decrease of volumes in each of the hydraulic pressure chambers A and B.

FIG. 1 illustrates two intake ports 18 and 19. A ring 20 is fixed to an inner surface of the master cylinder 1 for guiding the control piston 3 sliding inside of the first cylinder I. The ring 20 also functions as a pedestal for the compression spring 4. Reference numeral 121 designates a pump.

The systems for preventing the driving and driven wheels from skidding and the driving wheels from slipping will be described in detail hereinbelow.

FIG. 1 shows a braking system for a front-wheel-drive vehicle. The first hydraulic pressure chamber A communicates with the first brake system associated, for example, with the front-left and rear-right wheels. The second hydraulic pressure chamber B, on the other hand communicates with the second brake system associated with the front-right and rear-left wheels. The first brake system will now be described in detail below.

The first hydraulic pressure chamber A communicates by a main passage 21a, through a gate valve device GVI and a hold valve HVI, with a wheel cylinder Cd of the driving wheel. It also communicates with a wheel cylinder Cf of the driven wheel through the above elements in addition to a gate valve GVIV of a normally open type and a proportional valve PCV. The first hydraulic pressure chamber A always communicates with the wheel cylinders Cd and Cf through the gate valve device GVI of a normally open type. When a force is applied to the brake pedal, hydraulic pressure generated in the first hydraulic pressure chamber A is supplied to the wheel cylinders Cd and Cf. When the force applied to the brake pedal is released, hydraulic pressures in the wheel cylinders Cd and Cf exhaust to the first hydraulic pressure chamber A.

A decay valve DVI commuinates through a bypass passage 22 with the hydraulic pressure releasing chamber H and with the reservoirs 14 and 15. Hydraulic pressure for a brake is supplied to and exhausted from the wheel cylinders Cd and Cf by controlling a supply-and-exhaust valve group comprising the hold valve HVI and the decay valve DVI.

In a skid-prevention control of the system, hydraulic pressure from the accumuator 2 acts as a pressure for a brake through the fluid chamber $G_2$. In order to maintain the above condition, a supply passage 23 connected between the fluid chamber $G_2$ and the main passage 21 is provided with a switch valve PS1 of a normally closed type and a one-way valve CV.

The gate valve device GVI comprises a piston 24 being slidable therein. The gate valve device GVI closes the main passage 21 when hydraulic pressure in the fluid chamber $G_2$ is supplied to the gate valve device GVI though the switch valve PS1. More specifically, the piston 24 has a step portion where the hydraulic pressure of the main passage 21 acts on a small diameter of the piston 27 and the hydraulic pressure supplied through the switch valve PS1 acts on a large diameter of the piston 24. The piston 24 is always urged (rightwardly in FIG. 1) by the hydraulic pressure of the main passage 21 and by an elastic force of a compression spring 25 to thereby open a valve seat 26. If hydraulic pressure is supplied through the switch valve PS1 to the gate valve device GVI, the large diameter portion of the piston 24 is forced (leftwardly in FIG. 1), against an elastic force of the spring 25 to close the main passage 21 with the valve seat 26.

In a slip-prevention control, hydraulic pressure of the accumulator 2 is decompressed by a decompression valve 27 and is supplied to the main passage 21 through a switch valve PS2.

Figure 2:
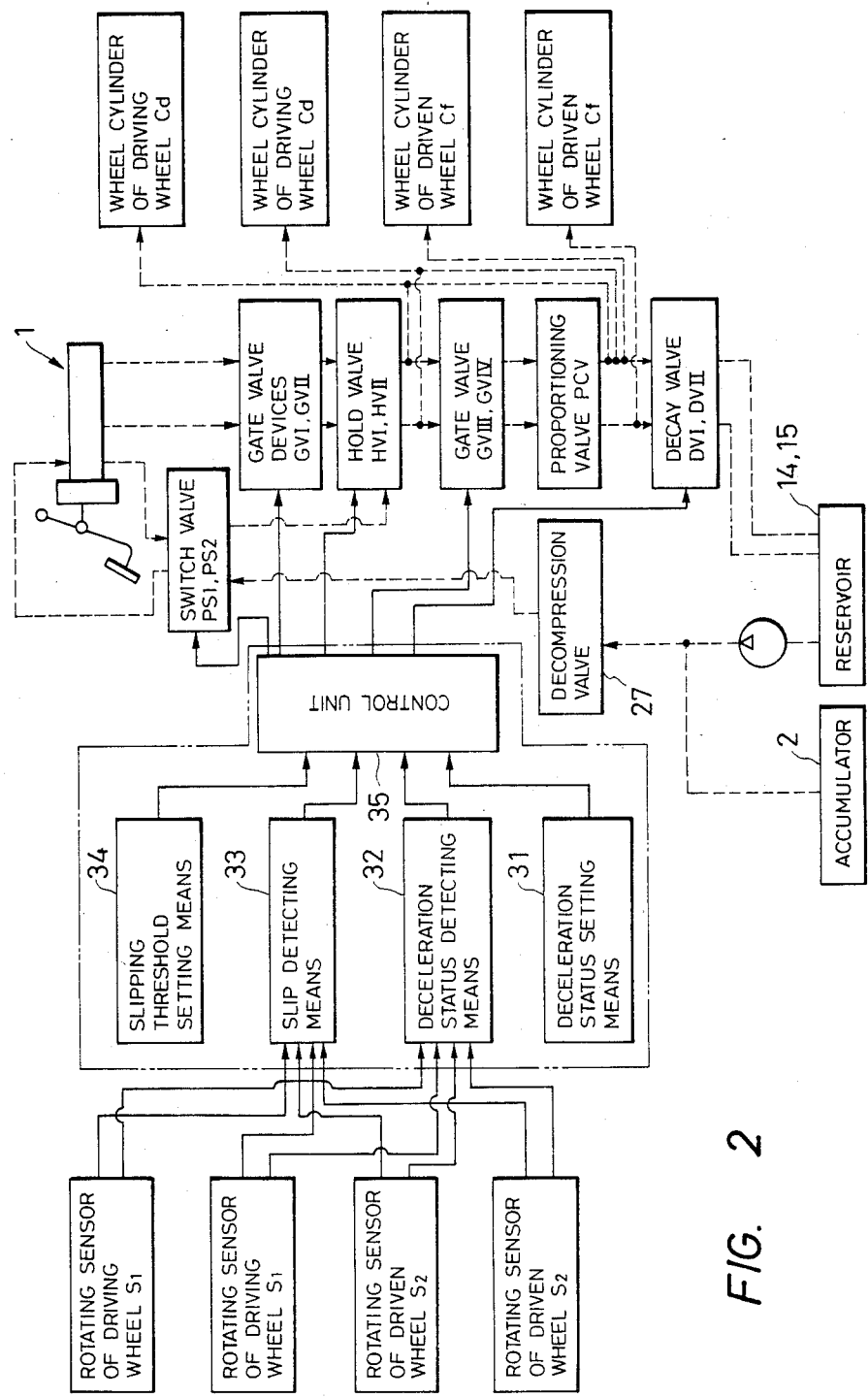
FIG. 2 is a circuit diagram showing the hydraulic control system of FIG. 1.

FIG. 2 is a block diagram showing the hydraulic control system of a first embodiment of the invention.

The rotational speed of the driving and driven wheels are detected by two pairs Of rotating sensors $S_1$ and $S_2$. A deceleration status threshold value setting means 31 predetermines, in view of a condition of the motor vehicle, a deceleration ratio of the wheels which is in a critical condition wherein the wheels do not skid, as a deceleration status threshold value. An actual deceleration ratio of the wheels is detected by a deceleration status detecting means 32 in accordance with ratios of variations, e.g. of the rotational speeds detected by the rotating sensors $S_1$ and $S_2$. A slipping ratio of the driving wheels, during the vehicle acceleration when it is starting to move, is detected by a slip detecting mean 33 based on an output of the rotating sensors $S_2$ of the driven wheels. A slipping ratio where the largest adhesion between the tires of the motor vehicle and the road is attained is predetermined by a slipping threshold value setting means 34. A control unit 35 consisting of a microcomputer, for example, controls the hold valves HVI and HVII and the decay valves DVI and DVII to maintain constant relationships between the actual deceleration ratio and the deceleration status threshold value and between the actual slipping ratio and the slipping threshold value.

In the skid-prevention control of the system, the switch valve PS1 opens at the initiation of the deceleration condition of the vehicle to thereby close the gate valve devices GVI and GVII by hydraulic pressure supplied from the fluid chamber $G_2$, so that hydraulic pressures in the first and second hydraulic pressure chambers A and B do not act on the brake action. In this condition, the hold valves HVI and HVII close to thereby maintain, in the wheel cylinders Cd and Cf, hydraulic pressure supplied from the first and second cylinders I and II in proportion to the force applied to the brake pedal, so that the motor vehicle decelerates.

If the actual deceleration ratio of the wheels in the first brake system detected by the deceleration status detecting means 32 comes up to within a predetermined distance from the deceleration status threshold value determined by the deceleration status threshold value setting means 31, the control unit 35 opens the decay valve DVI to thereby exhaust hydraulic pressure in the wheel cylinders Cd and Cf to the reservoir 14. Accordingly, the brake forces to the driving and driven wheels are released and then the rotating speed of the motor vehicle wheels is thereby increased.

If the actual deceleration ratio departs more than a predetermined value from the deceleration status threshold value, the control unit 35 opens the hold valve HVI and closes the decay valve DVI, so that hydraulic pressure in proportion to the force applied to the brake pedal is supplied from the fluid chamber $G_2$ to the wheel cylinders Cd and Cf through the switch valve PS1 and the hold valve HVI. Accordingly, brake force to each of the wheels increases. Thus, skidding of the wheels can be prevented by controlling the hold valves HVI, HVII and decay valves DVI, DVII to open and-/or close. A predetermined deceleration without skidding of the motor vehicle can thus be achieved.

In a slip-prevention control of the system, the switch valve PS2 opens while the switch valve PS1 closes to thereby close the gate valve devices GVI, GVII so that a communication between the master cylinder 1 and the wheel cylinders Cd and Cf is cut off. Further, gate valve devices GVIII and GVIV close so that the wheel cylinders Cd of the driving wheels are ready for being supplied with hydraulic pressure from the accumulator 2, which is decompressed to a predetermined pressure by the decompression valve 27. In this condition, no hydraulic pressure is supplied to the wheel cylinders Cf of the driven wheels.

If the slipping ratio of the driving wheels in the first braking system, e.g. detected by the slip detecting means 33 becomes much larger than the slipping threshold value predetermined by the slipping threshold setting means 34, then the control unit 35 opens the hold valve HVI so that the wheel cylinder Cd is supplied with hydraulic pressure decompressed as described above. The excessive slip of the driving wheels can thus be prevented.

When the actual slipping ratio comes up to a predetermined value from the slipping threshold value, the control unit 35 closes the hold valve HVI so that the actual slipping ratio is gently decreased. After that, if the actual slipping ratio reaches a predetermined appropriate value, the decay valve DVI opens to exhaust hydraulic pressure in the wheel cylinder Cd to the reservoir 14. In this condition, the motor vehicle accelerates with its full power while no brake force is supplied to the wheels.

The motor vehicle can thus accelerate with minimum slipping by controlling the hold valves HVI, HVII and decay valves DVI, DVII, and by using the hydraulic pressure decompressed by the decompression valve 27 to an appropriate pressure for the slip prevention control.

Figure 3:
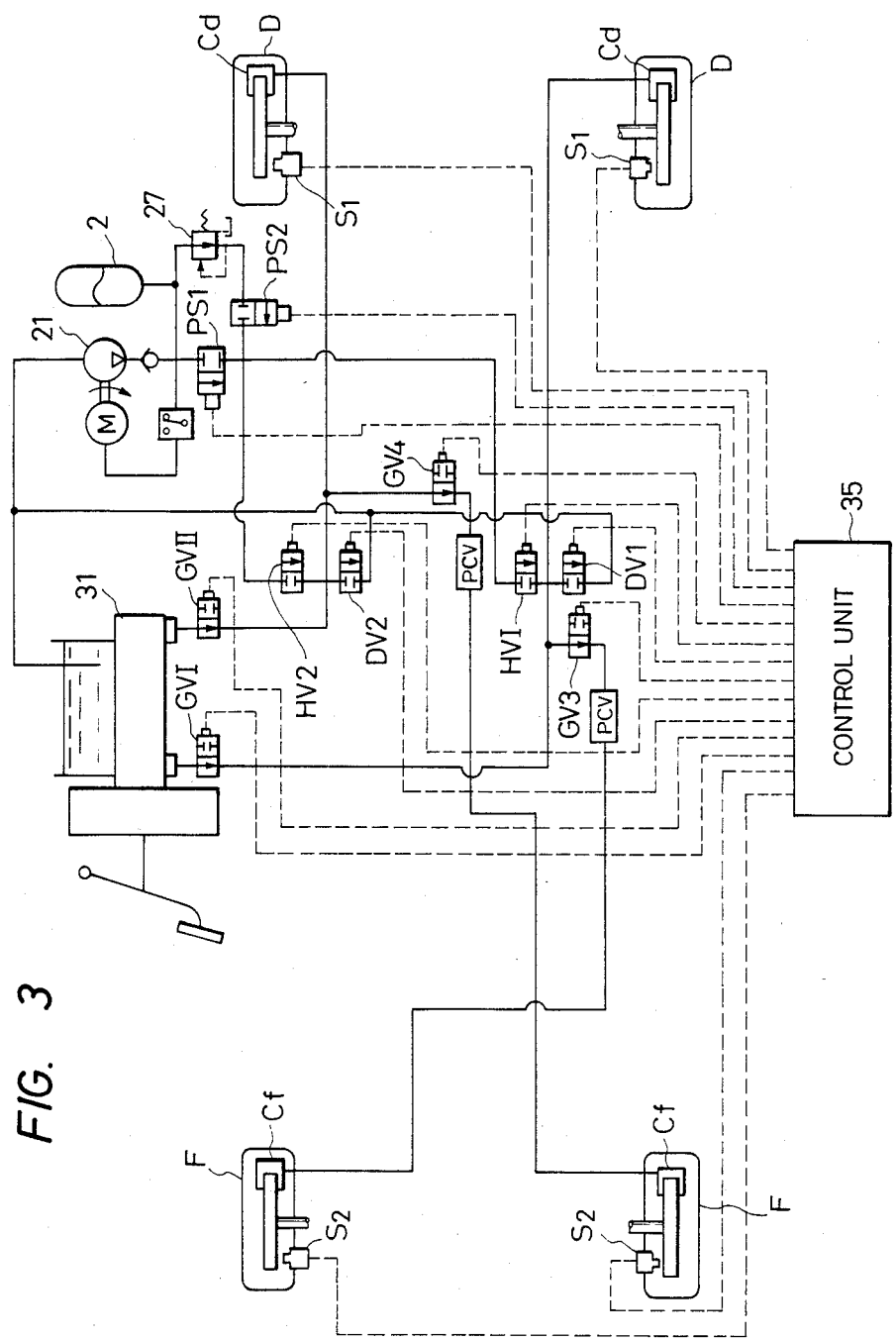
FIG. 3 is a circuit diagram showing a hydraulic control system of a second embodiment of the invention.

FIG. 3 is a circuit diagram showing a hydraulic control system of a second embodiment of the present invention. In FIG. 3 like parts and components are designated by the same reference numerals and characters as that in FIG. 1.

In the second embodiment of the invention, a first and second brake systems are controlled by employing a master cylinder 31 which is not provided with above-described first cylinder I for generating hydraulic pressure corresponding to a force applied to the brake pedal.

The system of FIG. 3 is substantially the same as that shown in FIG. 1 except for the following structures.

The system of FIG. 3 employs solenoid valves of a normally open type as gate valve devices GVI and GVII which open and close outputs of the first and second fluid chambers A and B, respectively. These gate valve devices GVI and GVII are controlled by the control unit 35 to close at the time when both skid and slip-prevention control are initiated. In the skid-prevention control of the system, an accumulator 2 is used for a hydraulic pressure source in the same way as in the slip-prevention control.

Figure 4:
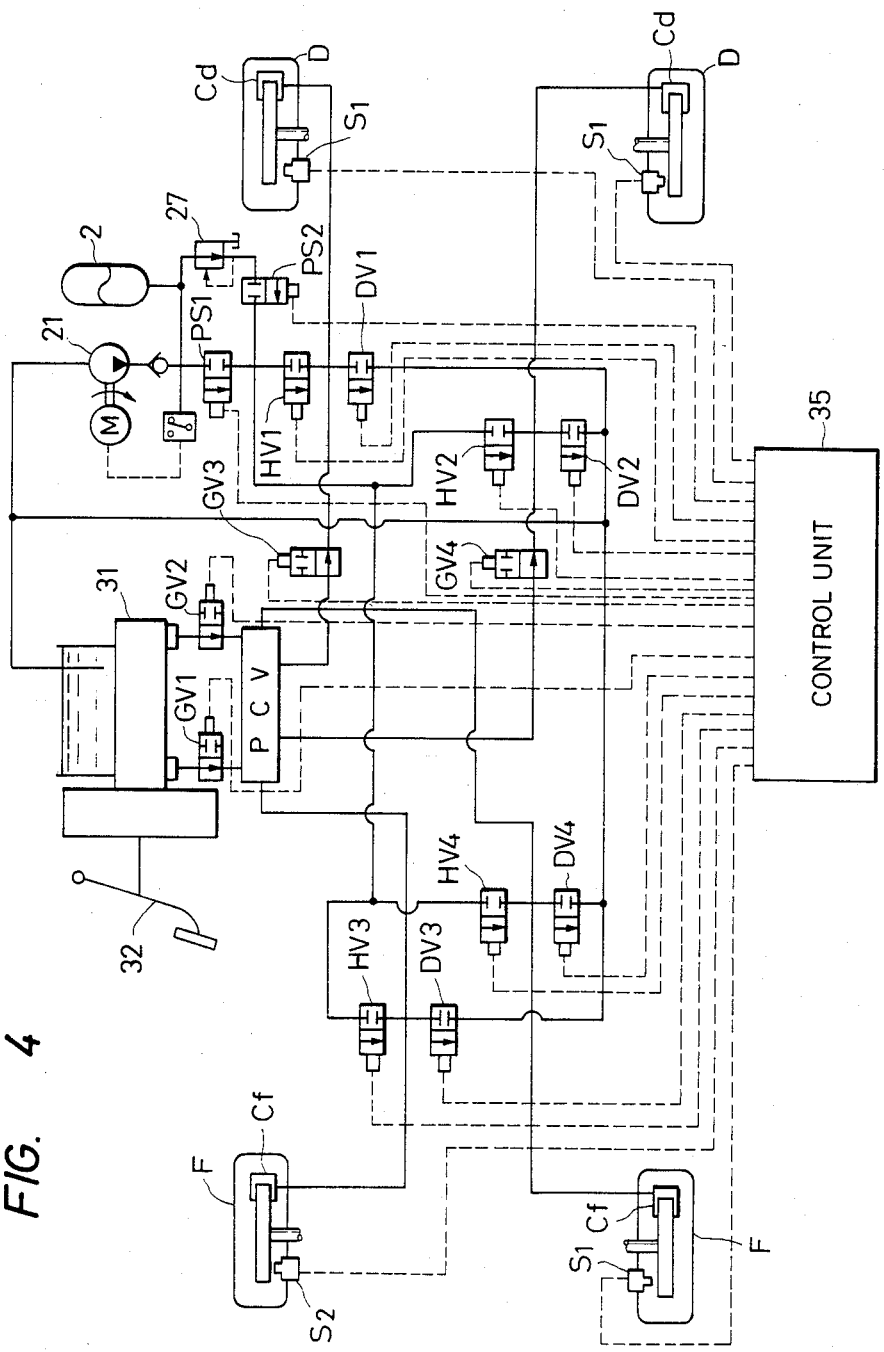
FIG. 4 is a circuit diagram showing a hydraulic control system of a third embodiment of the invention.

FIG. 4 is a circuit diagram showing a hydraulic control system of a third embodiment of the present invention. In FIG. 4, like parts and components are designated by the same reference numerals and characters shown in FIG. 1.

The system of the third embodiment of the invention comprises four independent brake systems for each of the driving wheels D and each of the driven wheels F.

In the third embodiment, the gate valve devices GVI and GVII close to thereby supply hydraulic pressure of the accumulator 2 to each of the brake systems in both skid and slip-prevention control. In the slip-prevention control, the control unit 35 closes the hold valves HV3 HV4 and opens the decay valves DV3 and DV4 provided in the brake system for the driven wheels F so that hydraulic pressure in the wheel cylinders Cf can be exhausted.

The system for controlling motor vehicle brake thus constructed is advantageous in that the slip of the driving wheels and skid of the driving and driven wheels are sufficiently minimized.

That is, in the slip-prevention control of the system when the motor vehicle accelerates, hydraulic pressure for a brake compressed by the compression valve 27 to an appropriate pressure is directly supplied to the supply-and-exhaust valve group, and then the control unit 35 controls the supply-and-exhaust valve group according to the predetermined slipping threshold value to achieve the maximum rotational speed of the driving wheels without slipping. Therefore, the driving wheels D rotate with an appropriate driving force without slipping.

In the skid-prevention control, hydraulic pressure for a brake having high in pressure is supplied to the supply-and-exhaust valve group without passing through the decompression valve 27 and the control unit 35 controls the supply-and-exhaust valve group according to the predetermined deceleration status threshold value so that hydraulic pressure decompressed to an appropriate pressure is supplied to the driving and driven wheels. Therefore, the vehicle decelerates without a skidding of the wheels.

What is claimed is:

1. A system for controlling motor vehicle brakes comprising:

means for detecting status of each of driving and driven wheels of a motor vehicle;

means for supplying hydraulic pressure to and exhausting hydraulic pressure from brakes of each of said driving and driven wheels; and means for controlling the supply-and-exhaust means according to an output of the detection means, said supply-and-exhaust means comprising:

an accumulator;

means for decompressing hydraulic pressure supplied from said accumulator; and means for switching a passage way from said accumulator to said decompression means.

2. A system for controlling motor vehicle brakes of claim 1, wherein said detection means comprises:

means for detecting rotational speed of the driving and driven wheels of the motor vehicle;

means for detecting slipping status of the driving wheels according to an output of the rotation detection means;

means for setting a slipping threshold value;

means for detecting a deceleration status of the wheels according to an output of said rotational detection means; and means for setting a deceleration status threshold value.

3. A system for controlling motor vehicle brakes of claim 2, wherein said control means actuates, in a slip-prevention control of the system during the start moving of acceleration of the vehicle, said switch means according to said slipping threshold value to thereby supply hydraulic pressure decompressed by said decompression means to said supply-and-exhaust means, and actuates, in a skid-prevention control of the system during the deceleration of the vehicle, said switch means according to said deceleration status threshold value to thereby supply hydraulic pressure not decompressed by said decompression means to said supply-and-exhaust means.

4. A system of claim 3, wherein said switch means comprises:

first means for supplying hydraulic pressure of said accumulator to the brakes without passing through said decompression means, said first means actuates during the deceleration of the vehicle; and second means for supplying hydraulic pressure of said accumulator to the brake through said decompression means, said second means actuates during the start moving or acceleration of the vehicle.

5. A system of claim 4, wherein both said first and second means consist of switch valves of normally close type.

* * * * *